F. C. HUGHES.
FILTER SUPPORTER.

No. 104,959.  Patented July 5, 1870.

United States Patent Office.

FRANK C. HUGHES, OF FRANKFORT, KENTUCKY.

Letters Patent No. 104,959, dated July 5, 1870.

IMPROVED FILTER-SUPPORTER.

The Schedule referred to in these Letters Patent and making part of the same.

*To all whom it may concern:*

Be it known that I, FRANK C. HUGHES, of Frankfort, in the county of Franklin and State of Kentucky, have invented a new and improved Filter-Supporter; and I do hereby declare that the following is a full, clear, and exact description thereof, which will enable others skilled in the art to make and use the same, reference being had to the accompanying drawing forming part of this specification.

Similar letters of reference indicate corresponding parts.

Figure 1:
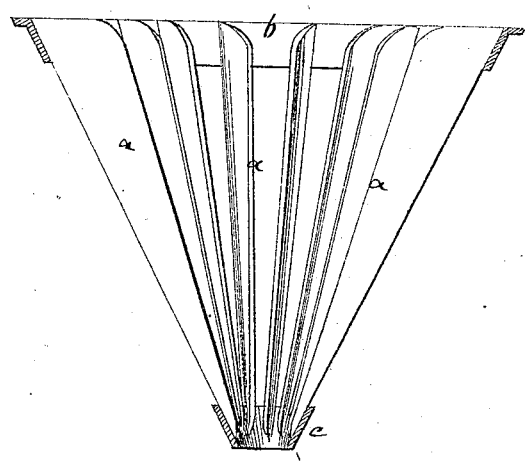
Figure 1 represents a vertical central section of my improved filter-supporter.
Figure 2:
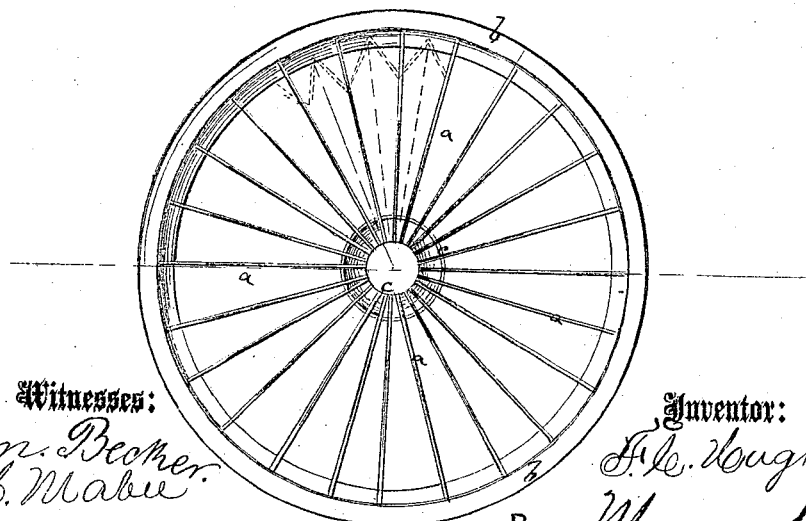
Figure 2 is a plan view of the same.

The object of this invention is to provide a funnel-shaped supporter for filters, whereby the entire surface of the filter will be utilized and the process of filtering consequently hastened.

The invention consists in making a supporter for filters of a series of ribs or bars, *a a*, which are, with their ends, respectively, secured to two rings, *b* and *c*, of which one is considerably larger than the other. The desired funnel shape is thereby produced.

By this instrument a filter can be so supported that it may be used in a funnel or other wide-mouthed vessel. It will be seen that the filter cannot be in continuous contact with its support, as in a funnel. The entire surface can, therefore, be used for filtering, which will materially hasten the operation. The open holder will also leave a channel for the escape of air from the bottle or vessel, and will not require the use of a stick, string, or other device necessary to keep funnels from closing too tight.

It will be readily perceived that the ribs *a* are in the shape of broad blades, which, protruding inward, have the effect to corrugate the paper, and to hold a large portion of its surface out of contact with everything but the liquid. Thus the filter is not only caused to maintain the desired position, but, being unsupported, except by edges, it is much better adapted to transfer the percolating fluid through its pores.

Having thus described my invention,

I claim as new and desire to secure by Letters Patent—

As an article of manufacture, a filter-supporter, formed of the large flanged ring, *b*, small conical ring, *c*, and the series of broad blades *a*, all arranged as and for the purpose described.

FRANK C. HUGHES.

Witnesses:
  J. M. MILLS,
  R. T. CHILES.